United States Patent [19]

Blasingame

[11] 4,000,924
[45] Jan. 4, 1977

[54] DEMOUNTABLE EQUIPMENT SUPPORT FRAME FOR TRUCK BODIES

[76] Inventor: Thomas W. Blasingame, P.O. Box 1532, Boise, Idaho 83702

[22] Filed: May 5, 1975

[21] Appl. No.: 574,460

[52] U.S. Cl. .............................. 296/35 A; 280/766
[51] Int. Cl.² ........................................ B62D 33/06
[58] Field of Search ............ 296/35 A, 35 R, 28 R, 296/28 F; 254/86 R; 280/150.5, 106 R, 106 T, 763, 764, 765, 766; 403/325; 52/733, 727, 731, 301

[56] References Cited

UNITED STATES PATENTS

| | | | |
|---|---|---|---|
| 2,942,912 | 6/1960 | Lucas | 296/35 A |
| 3,112,836 | 12/1963 | Back | 296/35 A |
| 3,162,419 | 12/1964 | Blasingame | 403/325 |
| 3,197,235 | 7/1965 | Chieger | 254/86 R |
| 3,448,998 | 6/1969 | Abolins | 254/86 R |
| 3,724,153 | 4/1973 | Wessells | 52/731 |

*Primary Examiner*—Robert R. Song
*Attorney, Agent, or Firm*—Morton S. Adler

[57] ABSTRACT

A demountable unit frame for supporting any one of a variety of commercially available equipment units is provided for use on a motor truck chassis. The frame includes spaced and braced longitudinal frame structural members carrying coupling device components for attachment to the truck chassis and is provided with transversely arranged outrigger members equipped with a rotatable shaft capable of cooperative association with removable commercially available landing gear devices for mounting and demounting of the unit frame and equipment units and for temporarily supporting the same when they are not mounted on the truck chassis.

8 Claims, 12 Drawing Figures

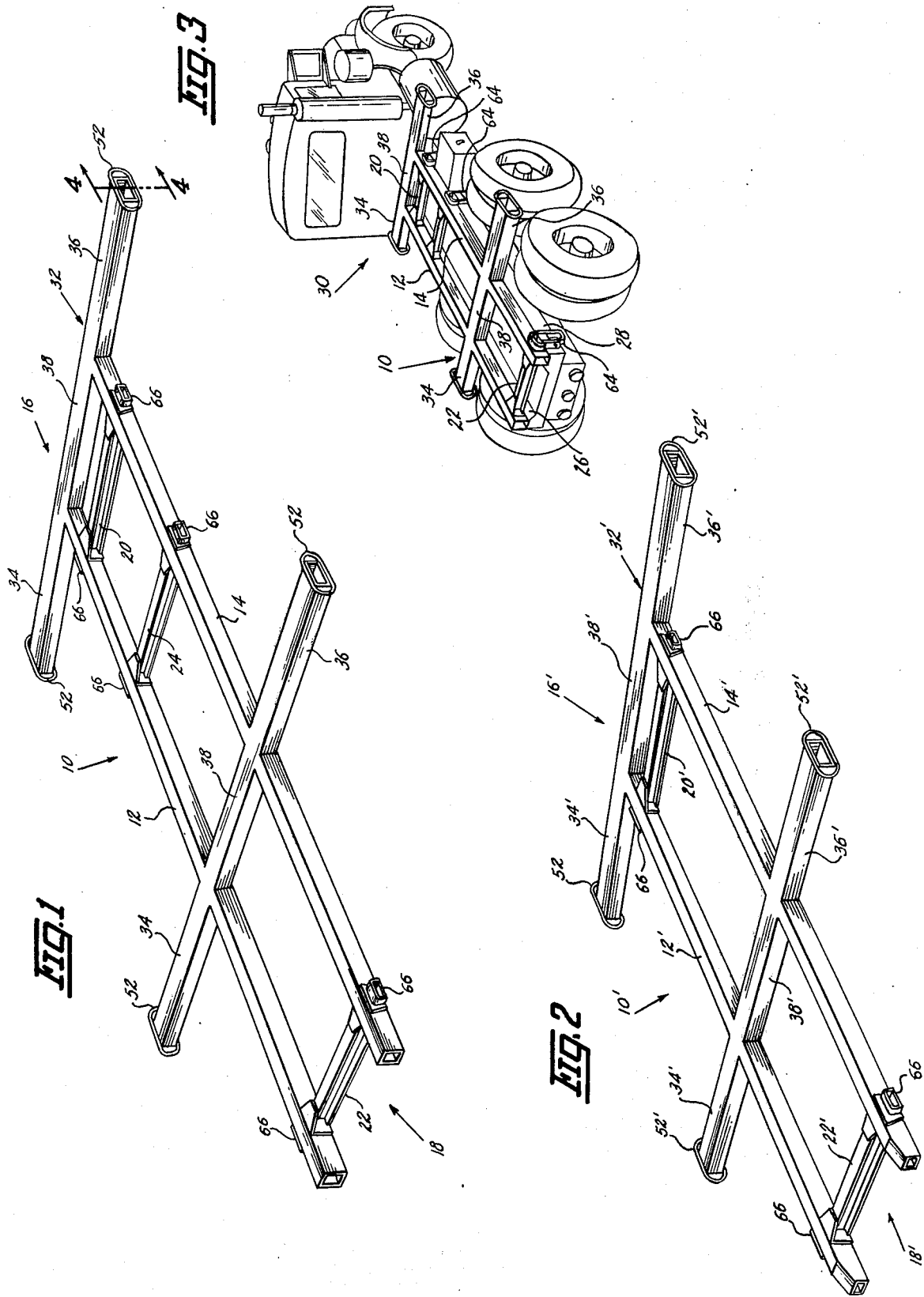

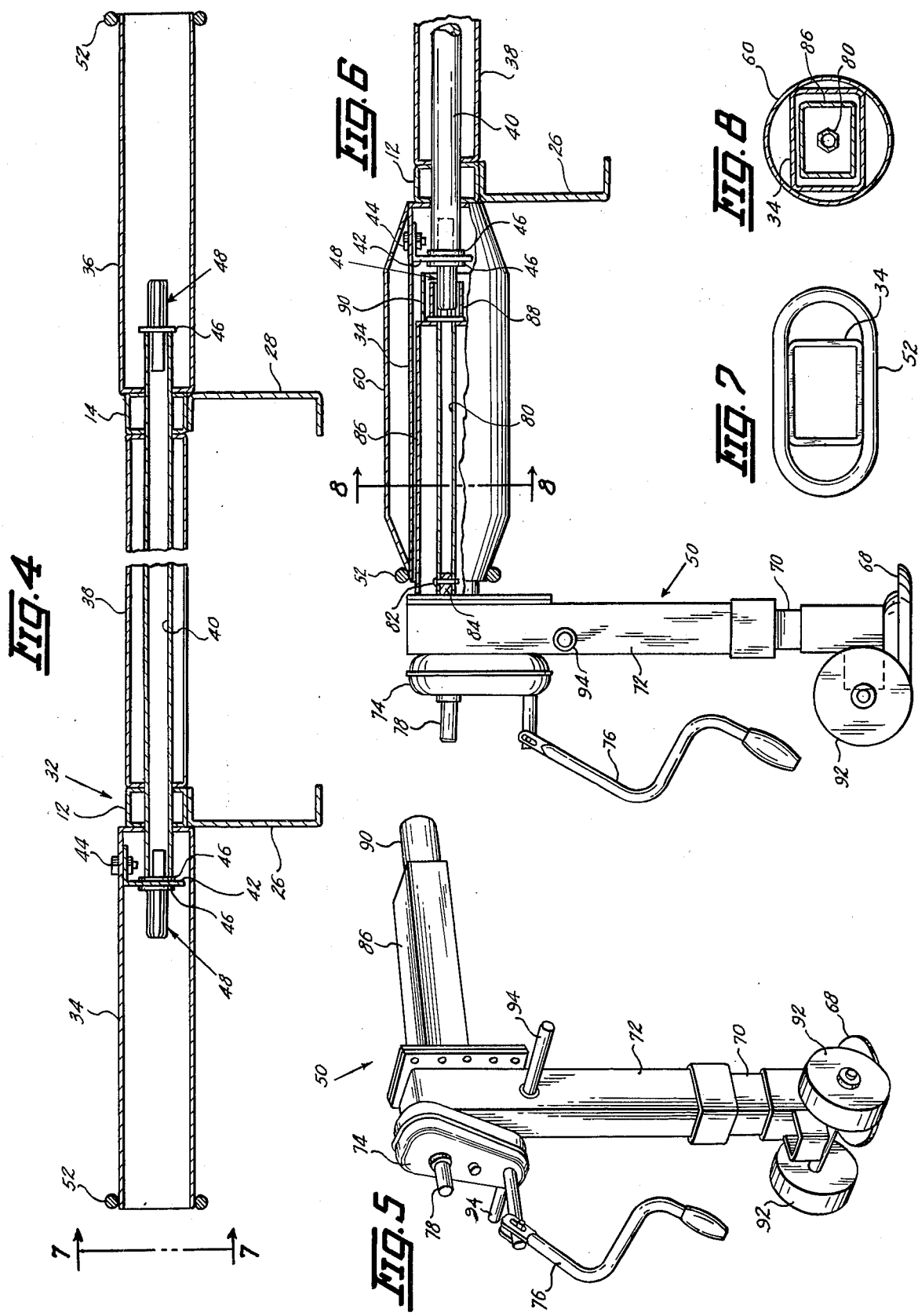

a minimum of frame height to provide the lowest possible center of gravity for the mounted equipment and cargo.

The foregoing objects and such further objects as may appear herein, or be hereinafter pointed out, together with the advantages of this invention will be more fully discussed and developed in the more detailed description of the accompanying drawings.

DEMOUNTABLE EQUIPMENT SUPPORT FRAME FOR TRUCK BODIES

BACKGROUND OF THE INVENTION

This invention relates to an improved unit frame for carrying specialized truck associated equipment and which can be detachably mounted on a motor truck chassis.

The motor truck chassis unit, being a relatively expensive piece of equipment as is well known, is most efficiently used when it can be utilized interchangeably with different types of service equipment units such as concrete mixers, dump bodies, tank units and fifth wheel devices, for example. Heretofore, such service equipment units have included a frame assembly formed as an integral part of the unit which provides temporary structural integrity during the fabrication and shipping of the equipment unit, and a means for bolting the equipment to the motor truck chassis, but does not provide means of supporting the equipment when the chassis is not present or, in the case of detachable bodies such as freight containers, includes exterior longitudinal structural members along the lateral extremities of the unit that are customarily tied into corner tie-down castings for attachment to the carrier vehicle chassis to add greater strength to the frame assembly and which inherently adds a substantial amount of weight. Such corner attachment method requires that outrigger means be provided on the carrier vehicle to support the mating corner tie-downs and this, in turn, adds a further considerable amount of weight to the carrier vehicle. The presence of the corner tie-down outriggers on the rear of a carrier vehicle restricts the usage of the vehicle to only certain types of equipment in addition to adding the additional weight.

Accordingly, with the above observations in mind, it is an important object of the present invention to provide a structural unit frame for truck associated equipment which can be detachably mounted on a motor truck chassis and which will provide adequate support for such equipment with a substantial reduction in weight and with no sacrifice in structural capacity as compared with the weight disadvantage of present structures for similar purposes.

More particularly, it is an object herein to provide a unit frame as characterized which includes spaced and braced longitudinal structurals carrying appropriate outrigger means for the use of removable landing gears in mounting and demounting of the unit frame and which are also provided with suitably arranged coupling devices for cooperation with complementary components therefor on the regular chassis frame rails of the carrier vehicle whereby corner tie-downs and outriggers of substantial weight as presently employed are eliminated.

Another object of the present invention is to provide a unit frame of the above class that can be used with all types of commercially available truck mounted equipment with a minimum of adaptation and without extensive modification of the carrier vehicle chassis.

A further object herein is to provide such a unit frame that is capable of supporting exceptionally heavy loadings despite uneven terrain and adverse operating conditions.

Still another object for the unit frame of this invention is to provide maximum support capacity with a

BRIEF DESCRIPTION OF THE DRAWINGS

FIG. 1 is a perspective view of this new unit frame,

FIG. 2 is a perspective view of a second embodiment of this unit frame, such embodiment showing a modification principally as to length for accomodation to different truck equipment units, FIG. 3 is a perspective view of this unit frame shown in place, for illustration, on a tandem axle motor truck chassis, FIG. 4 is a cross sectional view taken on the line 4—4 of FIG. 1 and including a portion of a truck chassis in section to show the relationship thereto, FIG. 5 is a perspective view of a landing gear of the type usable with this unit frame, FIG. 6 is an elevational view, partly in section, of the landing gear shown in operative relationship to an outrigger component on this unit frame and with the outrigger component shown with an optional round torque tube for use under certain conditions, FIG. 7 is an end view of an outrigger component taken from the line 7—7 of FIG. 4, FIG. 8 is a cross sectional view taken on the line 8—8 of FIG. 6, and FIGS. 9—12 inclusive are respective elevational schematic views for illustration showing this unit frame on a truck chassis for the respective equipment units of a concrete mixer, a tank unit, a fifth wheel frame and a dump body.

DESCRIPTION OF THE PREFERRED EMBODIMENTS

Figure 9:
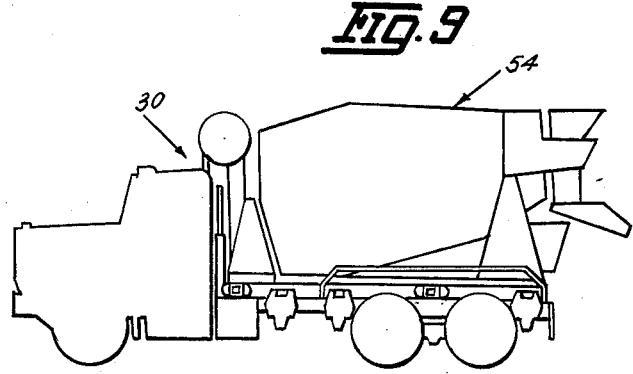

Referring to the drawings, this new unit frame is designated generally by the numeral 10 as best seen in FIG. 1 and in FIG. 2, where said frame is shown with slight modification for particular equipment, like parts are given like numerals primed. Frame 10 comprises a pair of parallel spaced longitudinal structural members 12 and 14, preferably of rectangular structural tubing, defining for purposes of description, a front end 16 and a rear end 18. Near the front and rear ends, 16 and 18, members 12 and 14 are rigidly secured in their spaced relationship by the respective cross members 20 and 22 and with a longer frame 10 (FIG. 1) as compared with a shorter frame 10' (FIG. 2), one or more intermediate members are preferably provided as indicated at 24 and thus far described, it is pointed out that the distance between the longitudinal structural members 12 and 14 is designed so that such respective members will register with the generally standardly arranged longitudinal frame members 26 and 28 on the chassis of a motor truck designated generally by the numeral 30.

Transversely of members 12 and 14 and secured thereto are the like outrigger assemblies 32 of which one is at the front end 16 and the other is spaced rearwardly therefrom as seen in FIGS. 1 and 2 and which are so arranged that they extend outwardly and perpendicularly from the respective members 12 and 14 a like distance to define the respective outriggers 34 and 36 with a central section 38 serving as additional bracing similar to members 20 and 22. Depending upon their relative location, each transverse outrigger assembly 32 may be fabricated in one section or with members 34, 36 and 38 fabricated in separate but joined sections as illustrated in FIG. 4.

An elongated shaft 40 disposed within sections 38 (FIG. 4) extends at opposite ends transversely through the respective frame members 12 and 14 and into the adjacent end portions of the respective outriggers 34 and 36 where, as shown in outrigger 34, it is rotably journalled in and supported by the retaining bracket 42 attached to the interior wall of the outrigger by the bolt means 44. Collar members 46 on bracket 42 serve to prevent any lateral movement of shaft 40. The respective ends of shaft 40 terminate in a shaped outline as at 48 for cooperation with a landing gear unit 50 as will be referred to later.

Figure 10:
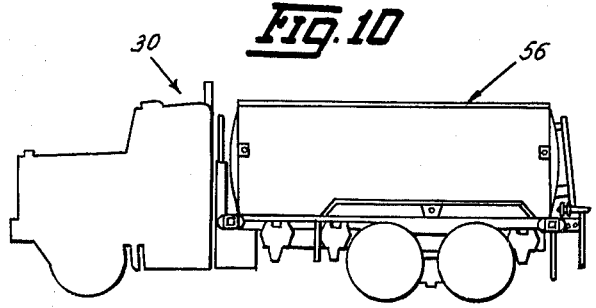
Figure 12:
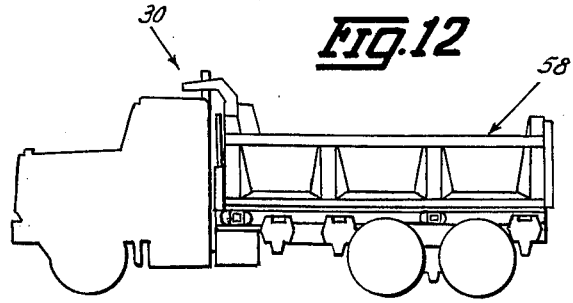

On the extended end portion of each outrigger 34 and 36 there is secured a lifting and protecting ring 52. Also, in cases where it is anticipated that a cargo will have to be manipulated in addition to the weight of the unit frame 10 (10') and any mounted equipment as illustrated for example in FIGS. 9, 10 and 12 and designated 54, 56 and 58 respectively, a cylindrical tube 60 is recommended for mounting on outriggers 34 and 36 as shown since a rectangular structure as shown for members 34 and 36 is not generally stable under torque and the round tube 60 added thereto will accommodate such torque with little or no deformation. The cylindrical tube eliminates the requirement for supplemental bracings for the outriggers.

Figure 11:
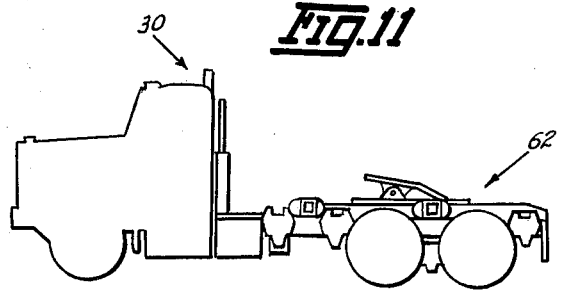

Thus far described, it is pointed out that a separate unit frame 10 or 10' is secured in any suitable manner to a respective piece of equipment as shown in FIGS. 9-12 and with frame 10' being particularly designed for the fifth wheel unit 62 shown in FIG. 11. Such frame units are removably secured to truck longitudinals 26 and 28 on chassis 30 and while various available coupling devices may be used for this purpose, the type I have preferably used is fully disclosed and described in my U.S. Pat. No. 3,162,419 and, in general, includes a movable latch component 64 secured to the chassis members 26 and 28 for cooperative engagement with a receiver component 66 attached to the frame units 10 or 10'. The number of such couplings may be varied and, preferably, I have placed one on each longitudinal structural member 26 and 28 at points in registration with the cross members 20, 22 and 24. Such coupling devices can be easily and quickly moved to and from locking position relative to the components to be secured and thus are particularly adaptable for use with the unit frames 10 and 10' described herein.

In mounting and demounting a unit frame 10 or 10' with an equipment unit attached (FIGS. 9-12) and for supporting said unit frame when it is not mounted on a chassis 30, such unit frames as described are designed for cooperative use with the landing gear 50 (FIGS. 5 and 6) which are adapted from a commercially available type commonly used with semi-trailers for which no invention per se is claimed here. In general, gear 50 includes a sand shoe 68 that carries the upstanding lower tube 70 on which there is vertically reciprocally arranged the upper tube 72. Such vertical movement, in effect a jacking arrangement, is provided in a well known manner by a gear box 74 which may be manually operated by handle 76 or connected to a power source (not shown) to shaft 78. In adapting such landing gear 50 as so far described for use with the unit frame of this invention, certain improvements and modifications have been made which are deemed to be novel and particularly useful with this invention and which are described as follows. Projecting perpendicularly from the top of the upper tube 72 is a shaft 80 connected by pin 82 to the stub shaft 84 operatively connected to the gear box 74 in a well known manner. Shaft 80 is encased in a housing 86 and includes a shaped end 88 protected by a guard 90, for mating connection with the shaped ends 48 of shaft 40. Positioning wheels 92 and positioning handles 94 have been added to gear 50 for convenience in use and it will be seen in FIG. 5 that wheels 92 are not normally in ground contact but can be placed in ground engaging position for easy movement of gear 50 by slightly tilting such gear when the gear is not attached to the unit frame.

In the use of the landing gear 50 as seen in FIGS. 5 and 6, it is manuevered on wheels 92 and conveniently guided by a grasp on handles 94 so that it may be introduced to the outrigger 34 whereby end 88 of shaft 80 mates with the shaped end 48 of shaft 40. A second landing gear 50 will be similarly introduced to the outrigger 36 so as to operatively engage shaft end 48 therein as described and by this arrangement, operation of gear box 74 on the landing gear 50 relative to outrigger 34 only will rotate shaft 40 so as to correspondingly operate the opposite landing gear 50 associated with outrigger 36 so that frame 10 or 10' can be quickly and simply elevated or lowered as desired. It will be understood that four landing gear units 50 are required to elevate or lower the unit frame and equipment mounted thereon and that all four landing gear can be removed from the unit frame when said unit frame is in place on the motor truck chassis for a substantial reduction in weight. It is also pointed out that any commercially available truck equipment unit already possessing a frame may be mounted on top of the unit frame similar to the manner in which it would normally be mounted on a motor truck or trailer chassis and also, if desired, the unit frame may be utilized as the frame assembly for such truck equipment and the previously used frame construction can be eliminated. Accordingly, in view of the foregoing, it is thought a full understanding of the construction and operation of this invention will be had and the advantages of the same will be appreciated.

I claim:

1. A demountable equipment support unit frame for motor trucks and related vehicles, comprising:

a pair of parallel spaced longitudinal structural members including a plurality of spaced transverse cross pieces secured thereto to define a unit frame having a front end and a rear end, an elongated outrigger assembly arranged transversely of and secured to said unit frame at said front end so as to define a central section intermediate said longitudinal structural members and a respective outrigger member projecting outwardly and perpendicularly from each longitudinal structural member, coupling components on said unit frame adapted for cooperation with complementary coupling components on a truck chassis, a second like outrigger assembly mounted to said unit frame at a predetermined point rearwardly of the front end thereof, an elongated shaft, means in said outrigger assembly for rotatably supporting said shaft so that it extends through said central section and into said respective outrigger members, a landing gear of the type having a support shoe, a vertical reciprocal lifting means on said landing gear with geared means for effecting such reciprocation, a structural member extending perpendicularly from said landing gear, a shaft carried by said structural member and operatively connected at one end to said geared means for rotation thereby, means on said shaft at the other end thereof for removable attachment to and operable engagement with the shaft in one of said outrigger members for rotating such shaft therein, and with a like improved landing gear operably disposed relative to opposed outrigger members on an outrigger assembly, the operation of the shaft on one landing gear by the geared means thereon automatically effecting the operation of the opposed landing gear to simultaneously selectively raise and lower said opposed landing gear and the resultant raising and lowering of said unit frame.

2. A unit frame as defined in claim 1 including:

wheel means on the lower portion of said landing gear normally out of ground contact but ground engageable by the tilting of said lifting means when said lifting means is separated from said outrigger assemblies, and handle means on said landing gear to facilitate tilting and maneuvering the same.

3. A unit frame as defined in claim 2 including said shaft extending at opposite ends from said central section through said respective longitudinal structural members into said respective outrigger members.

4. A unit frame as defined in claim 1 including a respective lifting and protecting ring secured to the extended extremity of each outrigger member.

5. A unit frame as defined in claim 1 including:
said outrigger members being rectangular in cross section, and
a respective cylindrical tube secured to each outrigger member coextensive with the length thereof.

6. A unit frame as defined in claim 1 including:
said outrigger members being rectangular in cross section,
a respective cylindrical tube secured to each outrigger member coextensive with the length thereof and
a respective lifting and protecting ring secured to the extended extremity of each outrigger member.

7. A unit frame as defined in claim 1 including a respective coupling component on said longitudinal structural members at respective points of registration with said cross members.

8. A unit frame as defined in claim 1 including said structural members, transverse pieces and said outrigger assemblies being planar with each other.

* * * * *